US012562996B2

(12) United States Patent
Prabhu et al.

(10) Patent No.: US 12,562,996 B2
(45) Date of Patent: Feb. 24, 2026

(54) SYSTEM AND METHOD FOR ACHIEVING NETWORK TRAFFIC FAIRNESS

(71) Applicant: Cisco Technology Inc., San Jose, CA (US)

(72) Inventors: Sundeep Patte Prabhu, Bangalore (IN); Rahul S. Naik, Acton, MA (US); Christopher D. Hoppe, Nashua, NH (US); Paul Andrew Jankovich, Northborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 18/422,794

(22) Filed: Jan. 25, 2024

(65) Prior Publication Data

US 2025/0247334 A1     Jul. 31, 2025

(51) Int. Cl.
| | |
|---|---|
| *H04L 47/625* | (2022.01) |
| *H04L 47/24* | (2022.01) |
| *H04L 47/62* | (2022.01) |

(52) U.S. Cl.
CPC .......... *H04L 47/6255* (2013.01); *H04L 47/24* (2013.01); *H04L 47/623* (2013.01)

(58) Field of Classification Search
CPC .... H04L 47/6255; H04L 47/24; H04L 47/623
See application file for complete search history.

(56) References Cited

U.S. PATENT DOCUMENTS

| | | |
|---|---|---|
| 2001/0050916 A1 | 12/2001 | Krishna et al. |
| 2010/0172264 A1 | 7/2010 | Jones |
| 2012/0213075 A1 | 8/2012 | Koie et al. |
| 2013/0070592 A1 * | 3/2013 | Chen ...................... H04L 47/10 |
| | | 370/230.1 |
| 2014/0355439 A1 | 12/2014 | Kakadia |
| 2016/0142333 A1 * | 5/2016 | Panchagnula ......... H04L 47/623 |
| | | 370/412 |
| 2017/0118108 A1 | 4/2017 | Avci et al. |
| 2022/0417569 A1 * | 12/2022 | O'Tuama ............ H04L 47/6215 |
| 2023/0110668 A1 * | 4/2023 | Frink ...................... H04L 47/52 |
| | | 370/329 |

* cited by examiner

*Primary Examiner* — Farzana B Huq
(74) *Attorney, Agent, or Firm* — Baker Botts L.L.P.

(57) ABSTRACT

In an embodiment, a method includes receiving a data packet with a quality-of-service (QoS) factor to be transmitted to an endpoint device, identifying a bonding group including multiple channels of dominant and remaining channels with each channel having respective queues, and determining queue occupancies for queues associated with the channels. The queues correspond to the QoS factor. The method also includes retrieving weights corresponding the QoS factor that are associated with the channels from a weight table. The weights are calculated based at least in part on a saturation threshold of the dominant channels. The method further includes generating adjusted queue occupancies based on the queue occupancies and the weights, selecting a first queue associated with a first channel based on the adjusted queue occupancies, and scheduling the first data packet for transmitting to the endpoint device via the first queue.

20 Claims, 5 Drawing Sheets

SYSTEM AND METHOD FOR ACHIEVING NETWORK TRAFFIC FAIRNESS

TECHNICAL FIELD

The present disclosure generally relates to network traffic control, and more specifically to systems and methods for packet queuing and scheduling.

BACKGROUND

Traffic queuing is the ordering of packets and applies to both input and output of data. Device modules can support multiple queues, which users can use to control the sequencing of packets in different traffic classes. Users can also set weighted random early detection and tail-drop thresholds. The device drops packets only when the configured thresholds are exceeded. Traffic scheduling is the methodical output of packets at a desired frequency to accomplish a consistent flow of traffic. Users can apply traffic scheduling to different traffic classes to weight the traffic by priority. The queuing and scheduling processes allow users to control the bandwidth that is allocated to the traffic classes, so that they can achieve the desired trade-off between throughput and latency for their networks.

DESCRIPTION OF EXAMPLE EMBODIMENTS

Overview

Figure 1:
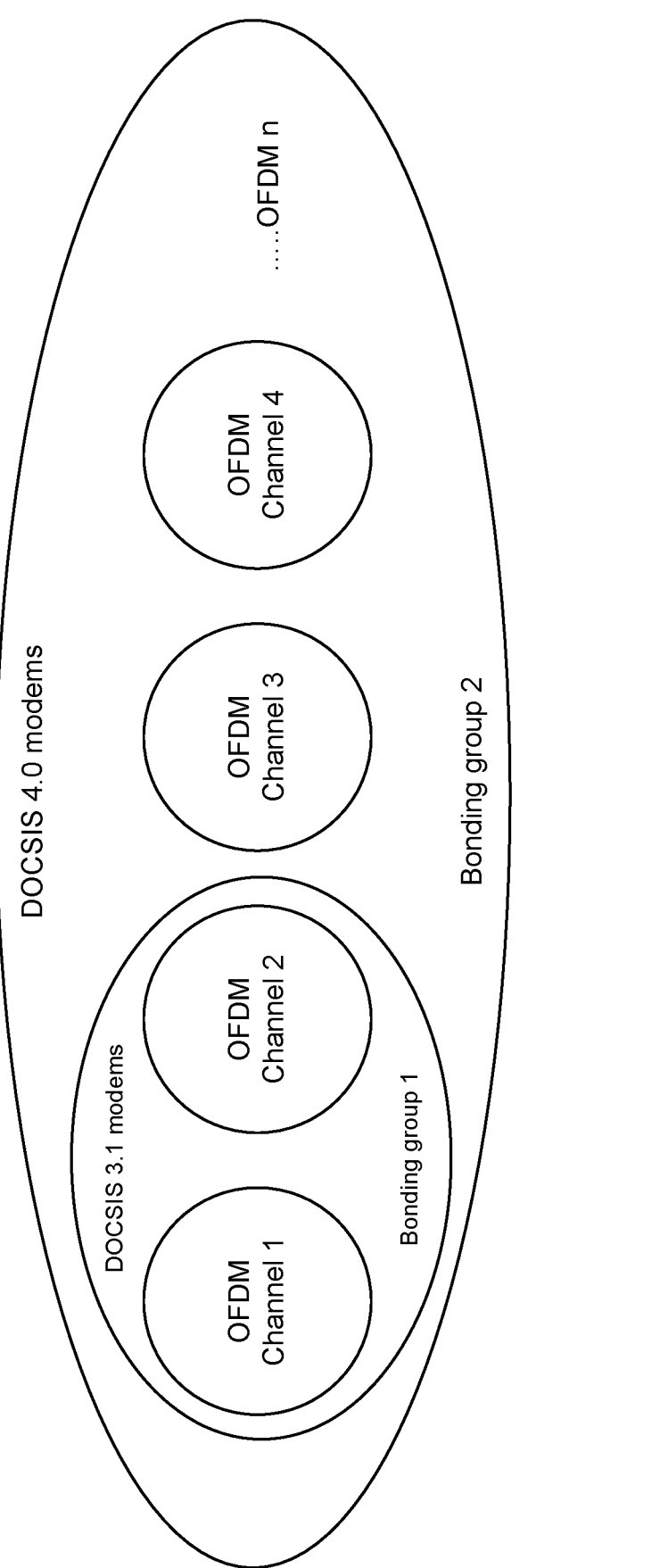
FIG. 1 illustrates bonding groups, in accordance with certain embodiments.

According to an embodiment, a system may include one or more processors and one or more computer-readable non-transitory storage media comprising instructions that, when executed by the one or more processors, cause one or more components of the system to perform operations. The operations include receiving a first data packet associated with a first quality-of-service (QoS) factor to be transmitted to an endpoint device and identifying a first bonding group associated with the first data packet. The first bonding group includes a plurality of channels including one or more dominant channels and one or more remaining channels. Each of the plurality of channels is associated with one or more respective queues. The operations also include determining a plurality of queue occupancies for a plurality of queues associated with the plurality of channels, respectively. The plurality of queues correspond to the first QoS factor. The operations also include retrieving a plurality of weights corresponding the first QoS factor that are associated with the plurality of channels, respectively, from a weight table based on the first QoS factor. The plurality of weights corresponding to the first QoS factor are calculated based at least in part on a saturation threshold associated with the one or more dominant channels. The operations further include generating a plurality of adjusted queue occupancies based on the plurality of queue occupancies and the plurality of weights corresponding the first QoS factor, selecting a first queue associated with a first channel from the plurality of queues associated with the plurality of respective channels based on the plurality of adjusted queue occupancies, and scheduling the first data packet for transmitting to the endpoint device via the first queue.

In certain embodiments, the operations include calculating a plurality of weights associated with the plurality respective channels corresponding to a plurality of QoS factors. Calculating a first weight of the plurality of weights that is associated with a first channel of the plurality of channels corresponding to a first QoS factor of the plurality of QoS factors is based on the saturation threshold associated with the one or more dominant channels, a rate factor associate with the first channel, and the first QoS factor; and storing the plurality of calculated weights in the weight table.

In some embodiments, the operations include receiving a second data packet associated with a second quality-of-service (QoS) factor to be transmitted to the endpoint device and identifying a second bonding group associated with the second data packet. The second bonding group may include the one or more remaining channels. Each of the one or more remaining channels may be associated with one or more respective queues. In certain embodiments, the operations include determining a plurality of queue occupancies for a plurality of queues associated with the one or more remaining channels, respectively. The plurality of queues may correspond to the second QoS factor. In some embodiments, the operations include selecting a second queue associated with a remaining channel from the plurality of queues associated with the one or more remaining channels based on the plurality of queue occupancies and scheduling the second data packet for transmitting to the endpoint device via the second queue.

In certain embodiments, the operations may include determining the first queue associated with the first channel has a lowest queue occupancy among the plurality of queues associated with the plurality of respective channels based on the plurality of adjusted queue occupancies.

The plurality of queue occupancies may be based on a plurality of queue utilizations, respectively.

The saturation threshold may be based on a channel bandwidth associated with the one or more dominant channels. The saturation threshold may be configurable by a user in real time.

The one or more dominant channels may include one or more DOCSIS 4.0 channels, respectively. The one or more remaining channels may include one or more DOCSIS 3.1 channels, respectively.

The one or more dominant channels may include one or more orthogonal frequency-division multiplexing (OFDM) channels, respectively. The one or more remaining channels may include one or more OFDM channels, respectively.

According to another embodiment, a method may include the steps of receiving a first data packet associated with a first quality-of-service (QoS) factor to be transmitted to an endpoint device and identifying a first bonding group associated with the first data packet. The first bonding group includes a plurality of channels including one or more dominant channels and one or more remaining channels. Each of the plurality of channels is associated with one or more respective queues. The method may also include the steps of determining a plurality of queue occupancies for a plurality of queues associated with the plurality of channels, respectively. The plurality of queues correspond to the first QoS factor. The method may also include the steps of retrieving a plurality of weights corresponding the first QoS factor that are associated with the plurality of channels, respectively, from a weight table based on the first QoS factor. The plurality of weights corresponding to the first QoS factor are calculated based at least in part on a saturation threshold associated with the one or more dominant channels. The method may further include the steps of generating a plurality of adjusted queue occupancies based on the plurality of queue occupancies and the plurality of weights corresponding the first QoS factor, selecting a first queue associated with a first channel from the plurality of queues associated with the plurality of respective channels based on the plurality of adjusted queue occupancies, and scheduling the first data packet for transmitting to the endpoint device via the first queue.

According to yet another embodiment, one or more computer-readable non-transitory storage media may embody instructions that, when executed by a processor, cause the performance of operations. The operations include receiving a first data packet associated with a first quality-of-service (QoS) factor to be transmitted to an endpoint device and identifying a first bonding group associated with the first data packet. The first bonding group includes a plurality of channels comprising one or more dominant channels and one or more remaining channels. Each of the plurality of channels is associated with one or more respective queues. The operations also include determining a plurality of queue occupancies for a plurality of queues associated with the plurality of channels, respectively. The plurality of queues correspond to the first QoS factor. The operations also include retrieving a plurality of weights corresponding the first QoS factor that are associated with the plurality of channels, respectively, from a weight table based on the first QoS factor. The plurality of weights corresponding the first QoS factor are calculated based at least in part on a saturation threshold associated with the one or more dominant channels. The operations further include generating a plurality of adjusted queue occupancies based on the plurality of queue occupancies and the plurality of weights corresponding the first QoS factor, selecting a first queue associated with a first channel from the plurality of queues associated with the plurality of respective channels based on the plurality of adjusted queue occupancies, and scheduling the first data packet for transmitting to the endpoint device via the first queue.

Technical advantages of certain embodiments of this disclosure may include one or more of the following. The systems and methods described herein may solve both packet scheduling and packet queuing problems in DOCSIS packet processing pipeline with a single algorithm. The systems and methods described herein may improve the traffic and service of the DOCSIS 3.1 modems as the DOCSIS 3.1 modems may starve of traffic and experience service disruption without the solution disclosed herein. The systems and methods described herein may improve traffic distribution between DOCSIS 4.0 and DOCSIS 3.1 modems. With a greater number of OFDM channels assigned to DOCSIS 4.0 modems, service to DOCSIS 3.1 modems may be guaranteed. The systems and methods described herein may simplify hardware implementation which uses less hardware resources and can be shipped with field upgrade, as there is no need to implement multiple new algorithms to handle the packet scheduling. The systems and methods described herein may be applicable in any technology upgrading from an older generation to a newer generation with increasing bandwidth. The systems and methods described herein may ensure network traffic fairness between older generation of the technology and newer generation of the technology, thereby not negatively impacting the service quality of older generation of the technology.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Any technology which involves radio frequency (RF) or spectrum component for transmission between nodes may use multiple modulation techniques for each channel. Each channel may be allocated independent queues. Some of the modulation techniques may include bonding between multiple channels to increase the bandwidth. When channels are bonded, each channel may have different bandwidth and different modulation schemes and an incoming packet can be sent to any of the channels which are part of the bonding group. To efficiently use the channel, it needs to be determined the channel to which the packet needs to be pushed to. In addition, the modulation schemes and bandwidth for each channel may change during course of operation based on the observed channel properties. This may lead to an uneven queuing problem, i.e., the queueing requirement may change dynamically and need to be updated to keep up with the changing requirement.

As an example and not by way of limitation, DOCSIS based cable network may support channels with orthogonal frequency-division multiplexing (OFDM) and single-carrier quadrature amplitude modulation (SC-QAM) modulation schemes. The OFDM and SC-QAM channels may offer different bandwidths for transmission. When service flows are set up, a given channel may be part of multiple service flows. Along with this, DOCSIS 3.0 and beyond may support channel bonding to increase the bandwidth for each cable modem. Channel bonding may include a logical process that combines data packets received on multiple independent channels into one higher-speed data stream. A cable model may be allocated multiple service flows. Each of the service flows may be associated with one or more channels, with a mix of OFDM and SC-QAM modulation schemes.

In DOCSIS 3.1 based network, channel bonding may be supported between OFDM and SC-QAM channels. When a service flow is set up, it may target a bonding group. From the perspective of cable modem termination system (CMTS), when a packet belonging to a given bonding group is to be transmitted, a channel may need to be selected to transmit the packet. This selection may result in a queuing problem. In an example conventional system, this selection may be handled using a shortest-queue-first (SQF) algorithm. When a packet belonging to a given bonding group is to be processed, the queue status (e.g., queue occupancy) for all the channels in the bonding group may be fetched. The packet may be then transmitted over the channel which has the lowest (or shortest) queue utilization. However, SQF algorithm may not take into consideration the channel rate, channel modulation or bonding group properties. The handling of queue occupancy may be the same for all conditions.

With DOCSIS 4.0 based network, there are some changes with bonding group configuration. DOCSIS 4.0 may allow up to 8 OFDM channels in one bonding group (DOCSIS 3.1 may limit this to 2 OFDM channels). As the network migrates to DOCSIS 4.0, the network may be required to give preference to DOCSIS 4.0 channels. A DOCSIS 4.0 channel may be defined as an OFDM channel which is used only by DOCSIS 4.0 modems. This means that DOCSIS 4.0 channels may need to be prioritized over other channels in terms of bandwidth. In other words, DOCSIS 4.0 channels may be viewed as dominant channels and may need to be saturated before DOCSIS 3.1 channels (i.e., remaining channels in a bonding group) are used. With the possibility of DOCSIS 4.0 channels being configured as both DOCSIS 3.1 compatible bonding group and DOCSIS 4.0 compatible bonding group, a fairness in allocation may become mandatory. This fairness for DOCSIS 4.0 channels may be a packet scheduling problem.

Many possible combinations of how DOCSIS 4.0 channels can be bonded may exist. Based on the bonding, the handling of the channel may vary. As an example and not by way of limitation, if a DOCSIS 4.0 channel is bonded as DOCSIS 3.1 compatible (i.e., up to 2 DOCSIS 4.0 channels in bonding group), then the channel may need to be treated as a regular DOCSIS 3.1 channel with no fairness necessary. In this case, the DOCSIS 4.0 channel bonded as DOCSIS 3.1 compatible may be viewed as a remaining channel in the bonding group. However, if a DOCSIS 4.0 channel is bonded DOCSIS 4.0 compatible (i.e., up to 8 DOCSIS 4.0 channels in bonding group), then fairness in allocation may be necessary. In this case, the DOCSIS 4.0 channel may be viewed as a dominant channel. In particular embodiments, packets may need to be scheduled to DOCSIS 4.0 channel until bandwidth saturation. Once the bandwidth of DOCSIS 4.0 channel is saturated, then the packet may need to be allocated based on queue occupancy of all the channels in the bonding group.

FIG. 1 illustrates bonding groups, in accordance with certain embodiments. Bonding group 1 may include OFDM channel 1 and OFDM channel 2, which are used by DOCSIS 3.1 modems. Bonding group 2 may include OFDM channels 1 to 4 (and may include more OFDM channels), which are used by DOCSIS 4.0 modems exclusively. OFDM channels 1 and 2 may carry DOCSIS 3.1 modem traffic and could carry DOCSIS 4.0 traffic. OFDM channels 3 and 4 may exclusively carry DOCSIS 4.0 traffic. When OFDM channels 3 and 4 are saturated with traffic, any excess DOCSIS 4.0 traffic may be sent on OFDM channels 1 and 2. Until then, OFDM channels 1 and 2 may only carry DOCSIS 3.1 traffic, and service fairness may be maintained between DOCSIS 3.1 and DOCSIS 4.0 modems.

As discussed above, packet scheduling is a complex problem and has multiple factors to be considered. Further, once the scheduling of the packet is done, another stage of queuing may be needed to finally determine the channel for transmission. In addition, packet scheduling may only be needed in cases where DOCSIS 4.0 compatible bonding group is supported. In systems where DOCSIS 4.0 is not supported, only the packet queuing may need to be done. This may lead to management of a complex processing pipeline which can be dynamic in nature. In addition to this, the packet processing pipeline may be implemented in hardware in converged broadband router platform. Hence, any solution may need to consider the implication on complexity of hardware implementation.

To address the complex problem of queuing and scheduling in the scenario where channels are bonded, the embodiments disclosed herein utilize a dynamically weighted shortest-queue-first algorithm (DW-SQF) for queuing and scheduling. This algorithm may manage both scheduling and queuing functions. It should be noted that although this disclosure describes the embodiments based on a DOCSIS 4.0 based network, the embodiments disclosed herein can be a generic solution to apply to all uneven queuing situations. The embodiments disclosed herein may be applicable in any technology that uses one or more channel modulation techniques (in RF/spectrum) over which bandwidth to end node can be increased by bonding two or more channels. As an example and not by way of limitation, the embodiments disclosed herein may be applicable to technologies such as Wi-Fi, 5G/6G, NG-PON, DOCSIS and any suitable technology that utilizes multiple OFDM channels. The embodiments disclosed herein may be applicable in any technology upgrading from an older generation to a newer generation with increasing bandwidth, for which network traffic fairness between older generation of the technology and newer generation of the technology may be ensured.

The DW-SQF algorithm may determine weights for each channel. The weight computation may take into consideration one or more parameters. In particular embodiments, the parameters may include one or more of rate of channel, quality-of-service (QoS) factor, or saturation threshold. The rate of channel may be used to determine the rate at which the queues of the corresponding channel get consumed. Based on the QoS factor, different queues may be used. As a result, the QoS factor may be used in weight computation as well.

The saturation threshold may add a fairness feature to the algorithm. Based on the saturation threshold, any channel (e.g., DOCSIS 4.0 channel) may be given preference up to a certain utilization level. Once this utilization level is reached, all channels may be then given equal preference. In particular embodiments, the saturation threshold may be configured at runtime and default to 90% of the channel bandwidth.

In particular embodiments, the weight for a channel with a corresponding QoS factor may be calculated as:

$$\text{Weight(channel,QoS)}=\text{Saturation threshold}\times\text{Rate of channel}\times\text{QoS factor.}$$

In particular embodiments, the calculated weights for the channels may be stored in a weight table for quick lookup when receiving an incoming packet.

Although FIG. 1 illustrates a particular number of bonding groups, modems, and OFDM channels, this disclosure contemplates any suitable number of bonding groups, modems, and OFDM channels. For example, bonding groups may include more than two bonding groups.

Although FIG. 1 illustrates a particular arrangement of bonding groups, modems, and OFDM channels, this disclosure contemplates any suitable arrangement of bonding groups, modems, and OFDM channels. For example, bonding group 1 may include OFDM channel 1 for DOCSIS 3.1 modems and bonding group 2 may include OFDM channels 2-$n$ for DOCSIS 4.0 modems.

Furthermore, although FIG. 1 describes and illustrates particular components, devices, or systems carrying out particular actions, this disclosure contemplates any suitable combination of any suitable components, devices, or systems carrying out any suitable actions.

Figure 2:
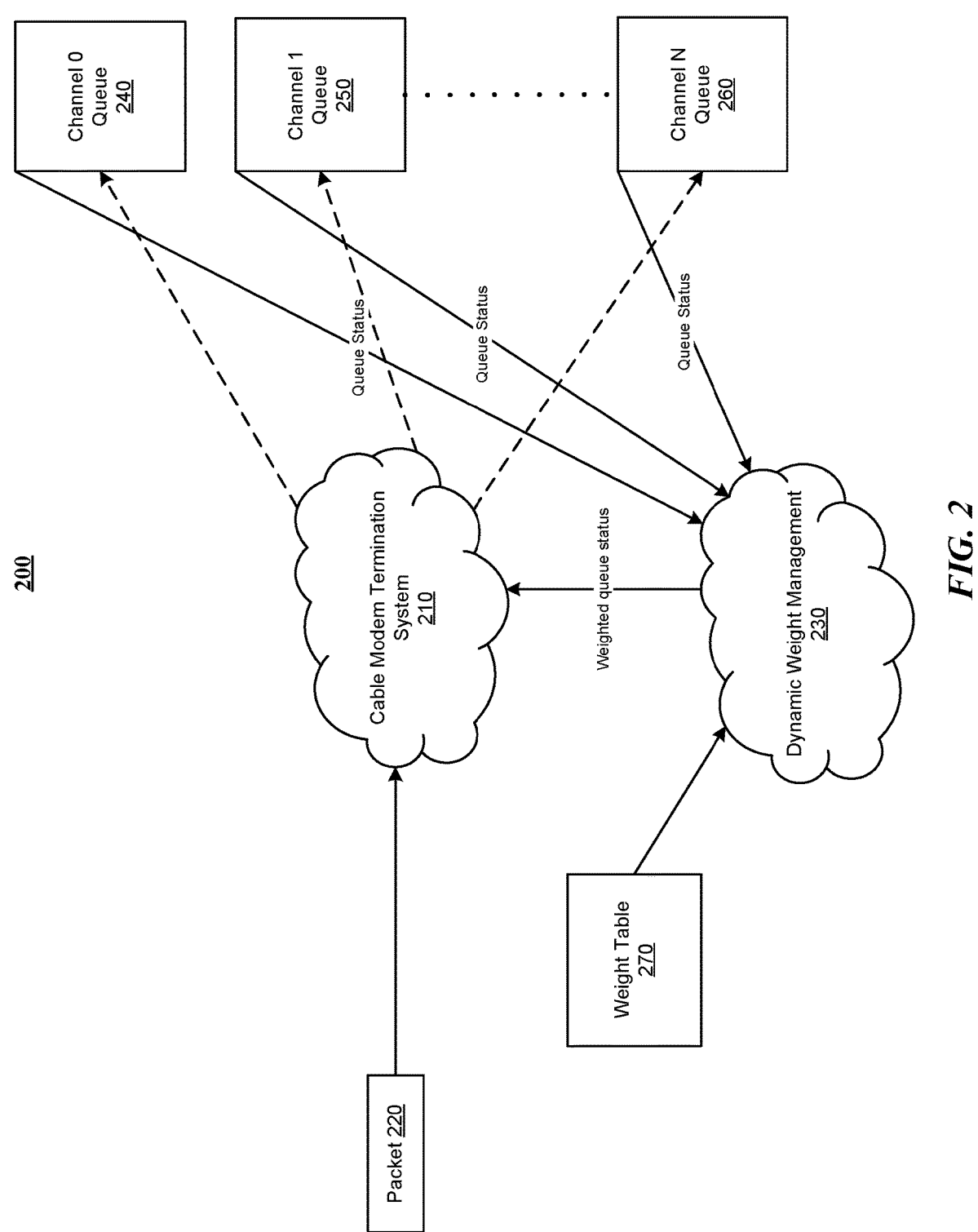
FIG. 2 illustrates a flow diagram for packet queuing and scheduling, in accordance with certain embodiments.

FIG. 2 illustrates a flow diagram 200 for packet queuing and scheduling, in accordance with certain embodiments. The cable modem termination system (CMTS) 210 may receiving an incoming packet 220. In particular embodiments, CMTS 210 may be a hardware device or a software component running on a server or a cloud computing system. For the incoming packet 220, CMTS 210 may determine what algorithm to use and appropriately apply the determined algorithm. As an example and not by way of limitation, CMTS 210 may look up a table comprising algorithm configurations.

Table 1 lists example algorithm configurations for different scenarios. D4.0 is the abbreviation for DOCSIS 4.0; D3.0 is the abbreviation for DOCSIS 3.0; D3.1 is the abbreviation for DOCSIS 3.1; D4.0 is the abbreviation for DOCSIS 4.0; and CM is the abbreviation for cable model. These scenarios relate to plant aging and cable modem backwards compatibility. Table 1 starts with the first choice for traffic if the first choice fits. As an example and not by way of limitation, the first group may be D4.0 CMTS plus D4.0 CM upper OFDM channels (e.g., 6-8). The second group may be D3.1 CMTS plus D4.0 CM mid OFDM channels (e.g., 3-5). The third group may be D3.1 CMTS plus D3.1 CM lower OFDM channels (e.g., 1-2). The fourth group may be D3.0 SC-QAM. In particular embodiments, a population of cable models may cover different areas of each of these four groups. In particular embodiments, the algorithm configurations may be changed by users based on actual implementational requirements, which may allow for dynamic adaptation of the algorithm based on the actual plant requirements.

TABLE 1

Example algorithm configurations for different scenarios.

|  | D4.0 CM (6-8) | D4.0 CM (3-5) | D4.0 CM (1-2) | D3.0 SC-QAM |
|---|---|---|---|---|
| D4.0 CMTS | DW-SQF | DW-SQF | SQF | SQF |
| D3.1 CMTS | DW-SQF | DW-SQF | DW-SQF | SQF |

The embodiments disclosed herein may handle scenarios related to plant aging. As the plant ages, the CM/CMTS configuration may be changed to accommodate the changing plant conditions. Based on the plant conditions, the user may configure the fairness to appropriately handle the bandwidth and priority on a per channel basis. This may allow for continued support for newer cable models on older CMTS, e.g., DOCSIS 4.0 on DOCSIS 3.1 CMTS, etc.

In one example embodiment, CMTS 210 may determine to use the DW-SQF algorithm. Once the algorithm is determined, dynamic weight management 230 may determine queue status (e.g., actual queue occupancy) for each channel, e.g., channel 0 queue 240, channel 1 queue 250, . . . , and channel N queue 260.

Based on bonding group of the packet 220, dynamic weight management 230 may fetch the corresponding weights from the weight table 270. The weights may be used to adjust the actual queue occupancy based on the type of the channel and the QoS of the packet 220. In particular embodiments, the adjusted queue occupancy for a channel with a corresponding QoS factor may be calculated as:

$$\text{Adjusted Queue occupancy (channel, } QoS) =$$
$$\text{Weight (channel, } QoS) + \text{Acutal Queue Occupancy (channel, } QoS).$$

In particular embodiments, weight adjustment may be dynamic in nature and may be tuned in real time. For each packet 220, the packet may be configured to use weights from the weight table 270 or use default weights (e.g., zero or fixed). In some embodiments, the weight table 270 may be configured in real time allowing to compensate for the dynamic nature of channel characteristics.

As an example and not by way of limitation, if the DOCSIS 4.0 channel is configured to be compatible with DOCSIS 3.1 bonding group, then the weights may be not used. The actual queue occupancy may be used as is. This may ensure that only the packet queuing algorithm is used in this case. Only when DOCSIS 4.0 channel is configured in DOCSIS 4.0 compatible bonding group mode, the weights may be used. As the DW-SQF algorithm is used in all conditions, the algorithm may ensure that once DOCSIS 4.0 channels are saturated, packet queuing is determined based on the requirements.

Dynamic weight management 230 may communicate the weighted queue status to CMTS 210. In particular embodiments, the adjusted queue occupancy may be then used by the DW-SQF algorithm to determine the destination channel for the packet 220.

Referring back to FIG. 1, the dynamically weighted shortest-queue-first (DW-SQF) algorithm may ensure network traffic fairness between DOCSIS 3.1 and DOCSIS 4.0 modems. For example, without the DW-SQF algorithm, the DOCSIS 3.1 modems may starve of traffic and experience service disruption. The DW-SQF algorithm may improve traffic distribution between DOCSIS 4.0 and DOCSIS 3.1 modems. With a greater number of OFDM channels assigned to DOCSIS 4.0 modems, service to DOCSIS 3.1 modems may be guaranteed.

It is to be understood that although FIG. 2 illustrates the disclosed embodiments using DOCSIS modems as examples, the embodiments disclosed herein may be applicable in any technology that uses one or more channel modulation techniques (in RF/spectrum) over which bandwidth to end node can be increased by bonding two or more channels. The embodiments disclosed herein may be applicable in any technology upgrading from an older generation to a newer generation with increasing bandwidth, for which network traffic fairness between older generation of the technology and newer generation of the technology may be ensured.

Figure 3A:
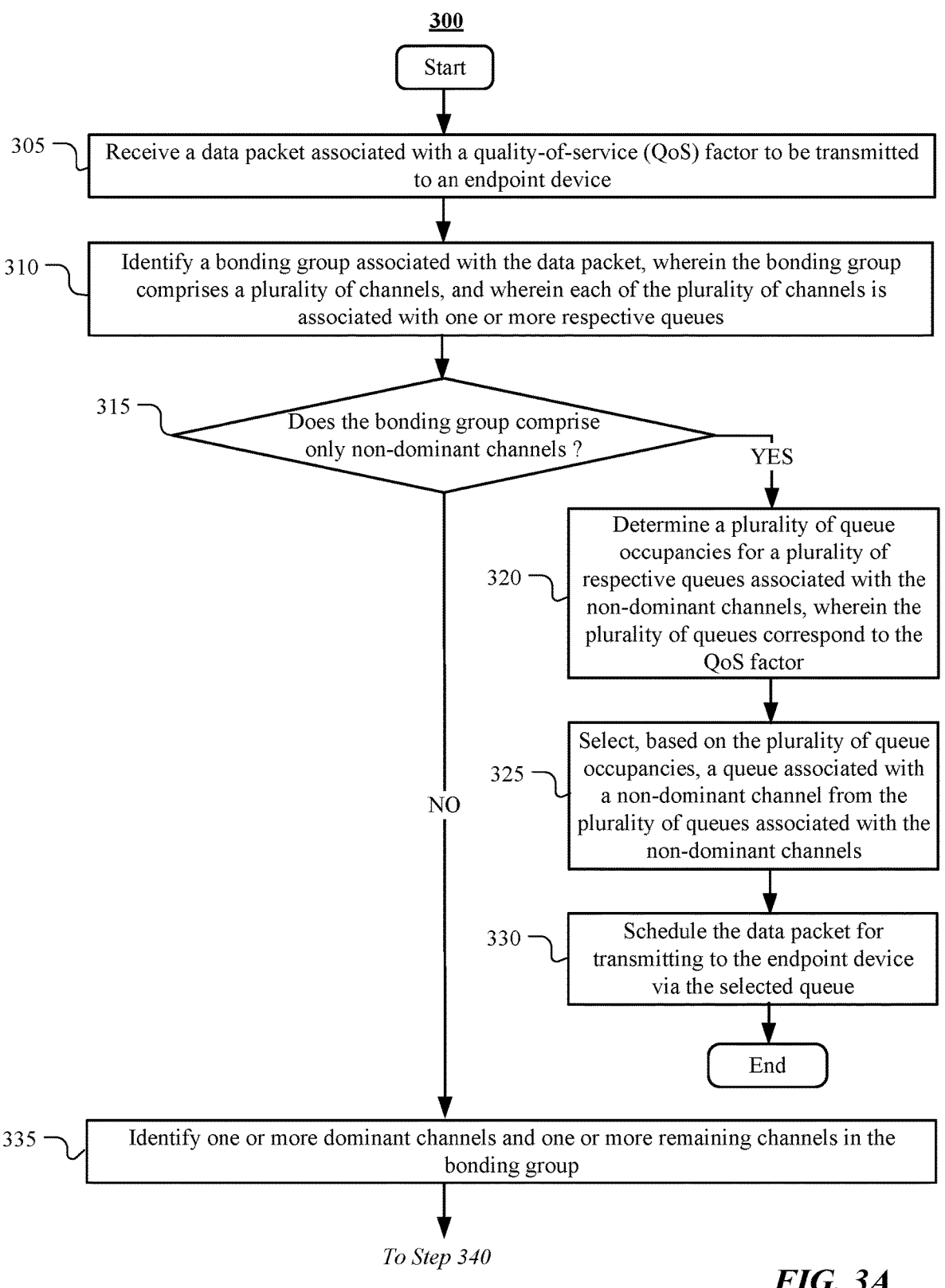
FIGS. 3A-3B illustrate a flow diagram of a method for packet queuing and scheduling, in accordance with certain embodiments.
Figure 3B:
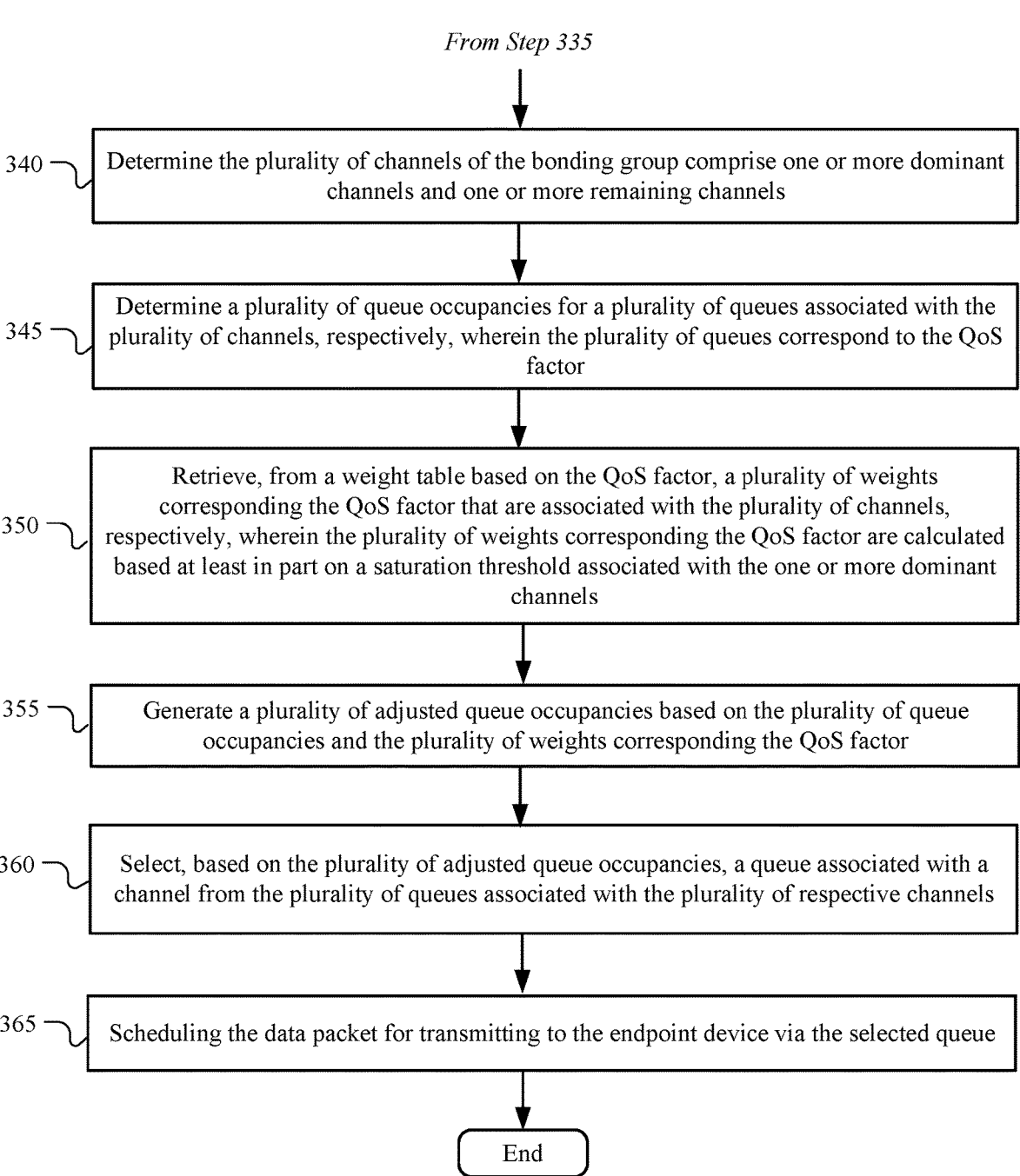

FIGS. 3A-3B illustrate a flow diagram of a method 300 for packet queuing and scheduling, in accordance with certain embodiments. In an embodiment, the steps of method 300 may be performed by a computing system such as CMTS 210. The method may start at step 305. At step 305, the computing system may receive a data packet associated with a quality-of-service (QoS) factor to be transmitted to an endpoint device.

At step 310, the computing system may identify a bonding group associated with the data packet. The bonding group may include a plurality of channels. Each of the plurality of channels may be associated with one or more respective queues.

At step 315, the computing system may determine whether the bonding group comprises only non-dominant channels. As an example and not by way of limitation, the non-dominant channels may be DOCSIS 3.1 channels. As another example and not by way of limitation, the non-dominant channels may be DOCSIS 4.0 channels that are bonded as DOCSIS 3.1 compatible, which may be treated as regular DOCSIS 3.1 channels.

If the bonding group includes only non-dominant channels, no fairness in allocation may be necessary. The method 300 may proceed to step 320, where the computing system may determine a plurality of queue occupancies for a plurality of respective queues associated with the non-dominant channels. The plurality of queues correspond to the QoS factor.

At step 325, the computing system may select, based on the plurality of queue occupancies, a queue associated with a non-dominant channel from the plurality of queues associated with the non-dominant channels.

At step 330, the computing system may schedule the data packet for transmitting to the endpoint device via the selected queue. The method 300 may then end.

If, at step 315, the bonding group includes dominant channels, fairness in allocation may be necessary. The method 300 may proceed to step 335, where the computing system may identify one or more dominant channels and one or more remaining channels in the bonding group. As an example and not by way of limitation, the dominant channels may be DOCSIS 4.0 channels.

At step 340, the computing system may determine the plurality of channels of the bonding group includes one or more dominant channels and one or more remaining channels.

At step 345, the computing system may determine a plurality of queue occupancies for a plurality of queues associated with the plurality of channels, respectively. The plurality of queues correspond to the QoS factor.

At step 350, the computing system may retrieve, from a weight table based on the QoS factor, a plurality of weights corresponding to the QoS factor that are associated with the plurality of channels, respectively. The plurality of weights corresponding to the QoS factor may be calculated based at least in part on a saturation threshold associated with the one or more dominant channels.

At step 355, the computing system may generate a plurality of adjusted queue occupancies based on the plurality of queue occupancies and the plurality of weights corresponding the QoS factor.

At step 360, the computing system may select, based on the plurality of adjusted queue occupancies, a queue associated with a channel from the plurality of queues associated with the plurality of respective channels.

At step 365, the computing system may schedule the data packet for transmitting to the endpoint device via the selected queue. The method 300 may then end.

It is to be understood that one or more steps of method 300 may be executed by a computing system. In other embodiments, the method 300 may be executed by one or more components of a system, such as CMTS 210 described in FIG. 2.

It is to be understood that the order in which the method 300 is described is not intended to be construed as a limitation, and any number of the described method steps may be combined, modified, or carried out in any order to implement the method 300 or alternative methods. Additionally, individual steps may be deleted from the method 300 without departing from the spirit and scope of the subject matter described herein. Furthermore, the method 300 can be implemented in any suitable hardware, software, firmware, or combination thereof.

It is to be understood that the method 300 may be applicable in any technology that uses one or more channel modulation techniques (in RF/spectrum) over which bandwidth to end node can be increased by bonding two or more channels. The method 300 may be applicable in any technology upgrading from an older generation to a newer generation with increasing bandwidth, for which network traffic fairness between older generation of the technology and newer generation of the technology may be ensured.

Figure 4:
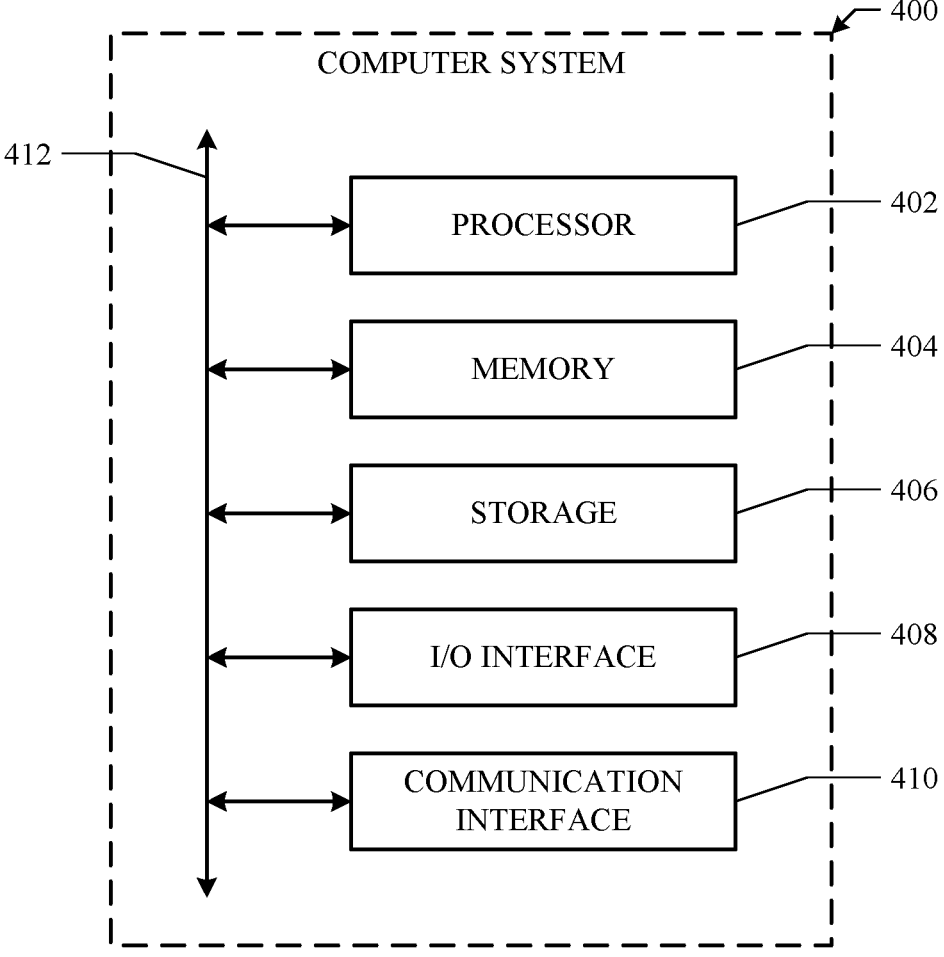
FIG. 4 illustrates a computer system, in accordance with certain embodiments.

FIG. 4 illustrates a computer system 400, in accordance with certain embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate.

In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "of" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:

one or more processors; and one or more computer-readable non-transitory storage media comprising instructions that, when executed by the one or more processors, cause one or more components of the system to perform operations comprising:

receiving a first data packet associated with a first quality-of-service (QoS) factor to be transmitted to an endpoint device;

identifying a first bonding group for transmitting the first data packet, wherein the first bonding group comprises a plurality of channels comprising a plurality of dominant channels and a plurality of remaining channels, and wherein each of the plurality of channels is associated with one or more respective queues;

determining a plurality of queue occupancies for a plurality of queues associated with the plurality of channels, respectively, wherein the plurality of queues correspond to the first QoS factor;

accessing a weight table comprising a plurality of weights associated with the plurality respective channels corresponding to a plurality of QoS factors;

retrieving, from the weight table based on the first QoS factor, a plurality of weights corresponding to the first QoS factor that are associated with the plurality of channels, respectively;

generating a plurality of adjusted queue occupancies based on the plurality of queue occupancies and the plurality of weights corresponding the first QoS factor;

determining, based on the adjusted queue occupancies, a utilization level of each of the plurality of dominant channels;

selecting, based on the plurality of adjusted queue occupancies, a first queue associated with a first channel from the plurality of queues associated with the plurality of respective channels, wherein a first weight of the plurality of weights that is associated with the first channel of the plurality of channels corresponding to the first QoS factor of the plurality of QoS factors is based on a saturation threshold associated with the plurality of dominant channels, a rate factor associate with the first channel, and the first QoS factor, wherein the first channel is identified from one or more dominant channels when the utilization level of each of the one or more dominant channels is under a threshold level, and wherein the first channel is identified from the plurality of dominant and remaining channels when the utilization level of each of the plurality of dominant channels reaches the threshold level; and scheduling the first data packet for transmitting to the endpoint device via the first queue.

2. The system of claim 1, the operations further comprising:

calculating the plurality of weights associated with the plurality respective channels corresponding to the plurality of QoS factors; and storing the plurality of calculated weights in the weight table.

3. The system of claim 1, wherein the plurality of queue occupancies are based on a plurality of queue utilizations, respectively.

4. The system of claim 2, wherein:

the saturation threshold is based on a channel bandwidth associated with the plurality of dominant channels; and the saturation threshold is configurable by a user in real time.

5. The system of claim 1, the operations further comprising:

determining the first queue associated with the first channel has a lowest queue occupancy among the plurality of queues associated with the plurality of respective channels based on the plurality of adjusted queue occupancies.

6. The system of claim 1, wherein:

the plurality of dominant channels comprise a plurality of DOCSIS 4.0 channels, respectively; and the plurality of remaining channels comprise a plurality of DOCSIS 3.1 channels, respectively.

7. The system of claim 1, wherein:

the plurality of dominant channels comprise a plurality of orthogonal frequency-division multiplexing (OFDM) channels, respectively; and the plurality of remaining channels comprise a plurality of OFDM channels, respectively.

8. The system of claim 1, the operations further comprising:

receiving a second data packet associated with a second QoS factor to be transmitted to the endpoint device;

identifying a second bonding group for transmitting the second data packet, wherein the second bonding group comprises the plurality of remaining channels, and wherein each of the plurality of remaining channels is associated with one or more respective queues;

determining a plurality of queue occupancies for a plurality of queues associated with the plurality of remaining channels, respectively, wherein the plurality of queues correspond to the second QoS factor;

selecting, based on the plurality of queue occupancies, a second queue associated with a remaining channel from the plurality of queues associated with the plurality of remaining channels; and scheduling the second data packet for transmitting to the endpoint device via the second queue.

9. A method, comprising:

receiving a first data packet associated with a first quality-of-service (QoS) factor to be transmitted to an endpoint device;

identifying a first bonding group for transmitting the first data packet, wherein the first bonding group comprises a plurality of channels comprising a plurality of dominant channels and a plurality of remaining channels, and wherein each of the plurality of channels is associated with one or more respective queues;

determining a plurality of queue occupancies for a plurality of queues associated with the plurality of channels, respectively, wherein the plurality of queues correspond to the first QoS factor;

accessing a weight table comprising a plurality of weights associated with the plurality respective channels corresponding to a plurality of QoS factors;

retrieving, from the weight table based on the first QoS factor, a plurality of weights corresponding to the first QoS factor that are associated with the plurality of channels, respectively;

generating a plurality of adjusted queue occupancies based on the plurality of queue occupancies and the plurality of weights corresponding the first QoS factor;

determining, based on the adjusted queue occupancies, a utilization level of each of the plurality of dominant channels;

selecting, based on the plurality of adjusted queue occupancies, a first queue associated with a first channel from the plurality of queues associated with the plurality of respective channels, wherein a first weight of the plurality of weights that is associated with the first channel of the plurality of channels corresponding to the first QoS factor of the plurality of QoS factors is based on a saturation threshold associated with the plurality of dominant channels, a rate factor associate with the first channel, and the first QoS factor, wherein the first channel is identified from one or more dominant channels when the utilization level of each of the one or more dominant channels is under a threshold level, and wherein the first channel is identified from the plurality of dominant and remaining channels when the utilization level of each of the plurality of dominant channels reaches the threshold level; and scheduling the first data packet for transmitting to the endpoint device via the first queue.

10. The method of claim 9, further comprising:

calculating the plurality of weights associated with the plurality respective channels corresponding to the plurality of QoS factors; and storing the plurality of calculated weights in the weight table.

11. The method of claim 9, wherein the plurality of queue occupancies are based on a plurality of queue utilizations, respectively.

12. The method of claim 10, wherein:

the saturation threshold is based on a channel bandwidth associated with the plurality of dominant channels; and the saturation threshold is configurable by a user in real time.

13. The method of claim 9, further comprising:

determining the first queue associated with the first channel has a lowest queue occupancy among the plurality of queues associated with the plurality of respective channels based on the plurality of adjusted queue occupancies.

14. The method of claim 9, wherein:

the plurality of dominant channels comprise a plurality of DOCSIS 4.0 channels, respectively; and the plurality of remaining channels comprise a plurality of DOCSIS 3.1 channels, respectively.

15. The method of claim 9, wherein:

the plurality of dominant channels comprise a plurality of orthogonal frequency-division multiplexing (OFDM) channels, respectively; and the plurality of remaining channels comprise a plurality of OFDM channels, respectively.

16. The method of claim 9, further comprising:

receiving a second data packet associated with a second QoS factor to be transmitted to the endpoint device;

identifying a second bonding group for transmitting the second data packet, wherein the second bonding group comprises the plurality of remaining channels, and wherein each of the plurality of remaining channels is associated with one or more respective queues;

determining a plurality of queue occupancies for a plurality of queues associated with the plurality of remaining channels, respectively, wherein the plurality of queues correspond to the second QoS factor;

selecting, based on the plurality of queue occupancies, a second queue associated with a remaining channel from the plurality of queues associated with the plurality of remaining channels; and scheduling the second data packet for transmitting to the endpoint device via the second queue.

17. A non-transitory computer-readable medium comprising instructions that are configured, when executed by a processor, to:

receive a first data packet associated with a first quality-of-service (QoS) factor to be transmitted to an endpoint device;

identify a first bonding group for transmitting the first data packet, wherein the first bonding group comprises a plurality of channels comprising a plurality of dominant channels and a plurality of remaining channels, and wherein each of the plurality of channels is associated with one or more respective queues;

determine a plurality of queue occupancies for a plurality of queues associated with the plurality of channels, respectively, wherein the plurality of queues correspond to the first QoS factor;

access a weight table comprising a plurality of weights associated with the plurality respective channels corresponding to a plurality of QoS factors;

retrieve, from the weight table based on the first QoS factor, a plurality of weights corresponding to the first QoS factor that are associated with the plurality of channels, respectively;

generate a plurality of adjusted queue occupancies based on the plurality of queue occupancies and the plurality of weights corresponding the first QoS factor;

determine, based on the adjusted queue occupancies, a utilization level of each of the plurality of dominant channels;

select, based on the plurality of adjusted queue occupancies, a first queue associated with a first channel from the plurality of queues associated with the plurality of respective channels, wherein a first weight of the plurality of weights that is associated with the first channel of the plurality of channels corresponding to the first QoS factor of the plurality of QoS factors is based on a saturation threshold associated with the plurality of dominant channels, a rate factor associate with the first channel, and the first QoS factor, wherein the first channel is identified from one or more dominant channels when the utilization level of each of the one or more dominant channels is under a threshold level, and wherein the first channel is identified from the plurality of dominant and remaining channels when the utilization level of each of the plurality of dominant channels reaches the threshold level; and schedule the first data packet for transmitting to the endpoint device via the first queue.

18. The non-transitory computer-readable medium of claim 17, further comprising instructions that are configured, when executed by a processor, to:

calculate the plurality of weights associated with the plurality respective channels corresponding to the plurality of QoS factors; and store the plurality of calculated weights in the weight table.

19. The non-transitory computer-readable medium of claim 17, wherein the plurality of queue occupancies are based on a plurality of queue utilizations, respectively.

20. The non-transitory computer-readable medium of claim 18, wherein:

the saturation threshold is based on a channel bandwidth associated with the plurality of dominant channels; and the saturation threshold is configurable by a user in real time.

* * * * *